United States Patent
Miyagi

(10) Patent No.: US 9,906,683 B2
(45) Date of Patent: Feb. 27, 2018

(54) IMAGE PROCESSING DEVICE, IMAGE FORMING APPARATUS, METHOD FOR PROCESSING IMAGE, AND NON-TRANSITORY RECORDING MEDIUM

(71) Applicant: Noriko Miyagi, Kanagawa (JP)

(72) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/297,252

(22) Filed: Oct. 19, 2016

(65) Prior Publication Data

US 2017/0142285 A1 May 18, 2017

(30) Foreign Application Priority Data

Nov. 12, 2015 (JP) .................................. 2015-222400

(51) Int. Cl.
| | |
|---|---|
| *H04N 1/387* | (2006.01) |
| *H04N 1/23* | (2006.01) |
| *H04N 1/393* | (2006.01) |

(52) U.S. Cl.
CPC ......... *H04N 1/3873* (2013.01); *H04N 1/2338* (2013.01); *H04N 1/2369* (2013.01); *H04N 1/3878* (2013.01); *H04N 1/393* (2013.01); *H04N 2201/0094* (2013.01)

(58) Field of Classification Search
None
See application file for complete search history.

(56) References Cited

U.S. PATENT DOCUMENTS

| | | |
|---|---|---|
| 2003/0058465 A1 | 3/2003 | Miyagi et al. |
| 2003/0095287 A1 | 5/2003 | Miyagi et al. |
| 2004/0114815 A1 | 6/2004 | Shibaki et al. |
| 2004/0165081 A1 | 8/2004 | Shibaki et al. |
| 2004/0165747 A1 | 8/2004 | Shibaki et al. |
| 2004/0252316 A1 | 12/2004 | Miyagi et al. |
| 2004/0257622 A1 | 12/2004 | Shibaki et al. |
| 2007/0206228 A1 | 9/2007 | Miyagi |
| 2008/0144975 A1 | 6/2008 | Shibaki et al. |
| 2009/0034002 A1 | 2/2009 | Shibaki et al. |

(Continued)

FOREIGN PATENT DOCUMENTS

JP 2007-150389 6/2007

*Primary Examiner* — Fan Zhang
(74) *Attorney, Agent, or Firm* — Harness, Dickey & Pierce, P.L.C.

(57) ABSTRACT

An image processing device includes a displacement amount acquisition unit to acquire an amount of displacement of an image, a geometric correction unit to apply image processing to an input image according to the amount of displacement to perform geometric correction of the input image, a write timing control unit to control write timing of the input image according to the amount of displacement to perform correction of the input image, and a correction mode determination unit to select a first correction mode or a second correction mode according to the amount of displacement when the image is printed-out. With the first correction mode, the geometric correction unit corrects the input image in a first and a second direction. With the second correction mode, the geometric correction unit corrects the input image in the first direction and the write timing control unit corrects the input image in the second direction.

22 Claims, 9 Drawing Sheets

| TYPES OF CORRECTION | | REGISTRATION CORRECTION | MAGNIFICATION CORRECTION | SKEW CORRECTION | TRAPEZOIDAL DISTORTION CORRECTION | OTHER CORRECTION |
|---|---|---|---|---|---|---|
| NO CUTTING | SIMPLEX PRINTING | SECOND CORRECTION MODE | | | FIRST CORRECTION MODE | |
| | DUPLEX PRINTING | FIRST CORRECTION MODE | | | | |
| CUTTING | | FIRST CORRECTION MODE | | | FIRST CORRECTION MODE | |

(56) References Cited

U.S. PATENT DOCUMENTS

| | | |
|---|---|---|
| 2009/0147313 A1 | 6/2009 | Miyagi et al. |
| 2009/0180164 A1 | 7/2009 | Miyagi |
| 2009/0213429 A1 | 8/2009 | Miyagi |
| 2010/0027038 A1 | 2/2010 | Miyagi |
| 2011/0149009 A1* | 6/2011 | Iriyama .................... B41J 2/473 347/247 |
| 2012/0121308 A1* | 5/2012 | Higuchi ................. B41J 11/706 400/621 |
| 2014/0168256 A1* | 6/2014 | Miyama .............. G06F 3/04845 345/625 |
| 2015/0249764 A1* | 9/2015 | Nakatani ............ G03G 15/0131 358/1.5 |
| 2016/0103410 A1* | 4/2016 | Yamamoto ......... G03G 15/6567 399/388 |
| 2016/0191744 A1 | 6/2016 | Miyagi |

* cited by examiner

FIG. 5

| RESULT OF DETERMINATION BY CORRECTION MODE DETERMINATION UNIT | COORDINATE DATA SENT FROM CORRECTION AMOUNT DISTRIBUTION UNIT TO GEOMETRIC CORRECTION PARAMETER SETTING UNIT 120 | | COORDINATE DATA SENT FROM CORRECTION AMOUNT DISTRIBUTION UNIT TO WRITE CONTROL PARAMETER SETTING UNIT 121 | |
|---|---|---|---|---|
| | 4 TARGET POINTS | 4 CORRECTION TARGET POINTS | 4 TARGET POINTS | 4 CORRECTION TARGET POINTS |
| FIRST CORRECTION MODE | (s0, t0)<br>(s1, t1)<br>(s2, t2)<br>(s3, t3) | (u0, v0)<br>(u1, v1)<br>(u2, v2)<br>(u3, v3) | (s0, t0)<br>(s1, t1)<br>(s2, t2)<br>(s3, t3) | (s0, t0)<br>(s1, t1)<br>(s2, t2)<br>(s3, t3) |
| SECOND CORRECTION MODE | (s0, t0)<br>(s1, t1)<br>(s2, t2)<br>(s3, t3) | (s0, v0)<br>(s1, v1)<br>(s2, v2)<br>(s3, v3) | (s0, t0)<br>(s1, t1)<br>(s2, t2)<br>(s3, t3) | (u0, t0)<br>(u1, t1)<br>(u2, t2)<br>(u3, t3) |

FIG. 6

| TYPES OF CORRECTION | | REGISTRATION CORRECTION | MAGNIFICATION CORRECTION | SKEW CORRECTION | TRAPEZOIDAL DISTORTION CORRECTION | OTHER CORRECTION |
|---|---|---|---|---|---|---|
| NO CUTTING | SIMPLEX PRINTING | SECOND CORRECTION MODE | | | FIRST CORRECTION MODE | |
| | DUPLEX PRINTING | FIRST CORRECTION MODE | | | FIRST CORRECTION MODE | |
| CUTTING | | FIRST CORRECTION MODE | | | FIRST CORRECTION MODE | |

US 9,906,683 B2

IMAGE PROCESSING DEVICE, IMAGE FORMING APPARATUS, METHOD FOR PROCESSING IMAGE, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2015-222400, filed on Nov. 12, 2015, in the Japan Patent Office, the entire disclosure of which is hereby incorporated by reference herein.

BACKGROUND

Technical Field

Embodiments of the present invention relate to an image processing device, an image forming apparatus, a method for processing an image, and a non-transitory recording medium.

Related Art

Misregistration and skew distortion may occur in an electrophotographic image forming apparatus, and front-to-back displacement may occur in an image forming apparatus capable of printing images on both sides of a sheet of paper. To cope with such misregistration, displacement, distortion and the like, a correction technique that measures an amount of misregistration, displacement, distortion or the like and corrects a position or a deformation of the image to compensate the measured amount from the image has been known. Examples of corrections performed with the technique include a parallel shift correction, a magnification correction, a distortion correction, a color deviation correction, and a correction with front-to-back registration. Such a correction technique uses, for example, electric control to adjust and correct an image write cycle, and performs image processing to rewrite and correct image data.

SUMMARY

An image processing device, according to one embodiment, includes a displacement amount acquisition unit configured to acquire an amount of displacement of an image, in which the displacement occurs when the image is printed out, a geometric correction unit configured to apply image processing to an input image according to the amount of displacement to perform geometric correction of the input image, a write timing control unit configured to control write timing of the input image according to the amount of displacement to perform correction of the input image; and a correction mode determination unit configured to select one of a first correction mode and a second correction mode according to the amount of displacement. when the image is printed out. When the first correction mode is selected, the geometric correction unit corrects the input image in a first direction and a second direction. When the second correction mode is selected, the geometric correction unit corrects the input image in the first direction and the write timing control unit corrects the input image in the second direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a table for explaining an example of correction amount distribution performed by a correction amount distribution unit of FIG. 2 based on a result of determination of a correction mode determination unit of FIG. 2;

FIG. 6 is a table for explaining an example of how the correction mode is selected by the correction mode determination unit of FIG. 2;

DETAILED DESCRIPTION

Figure 1:
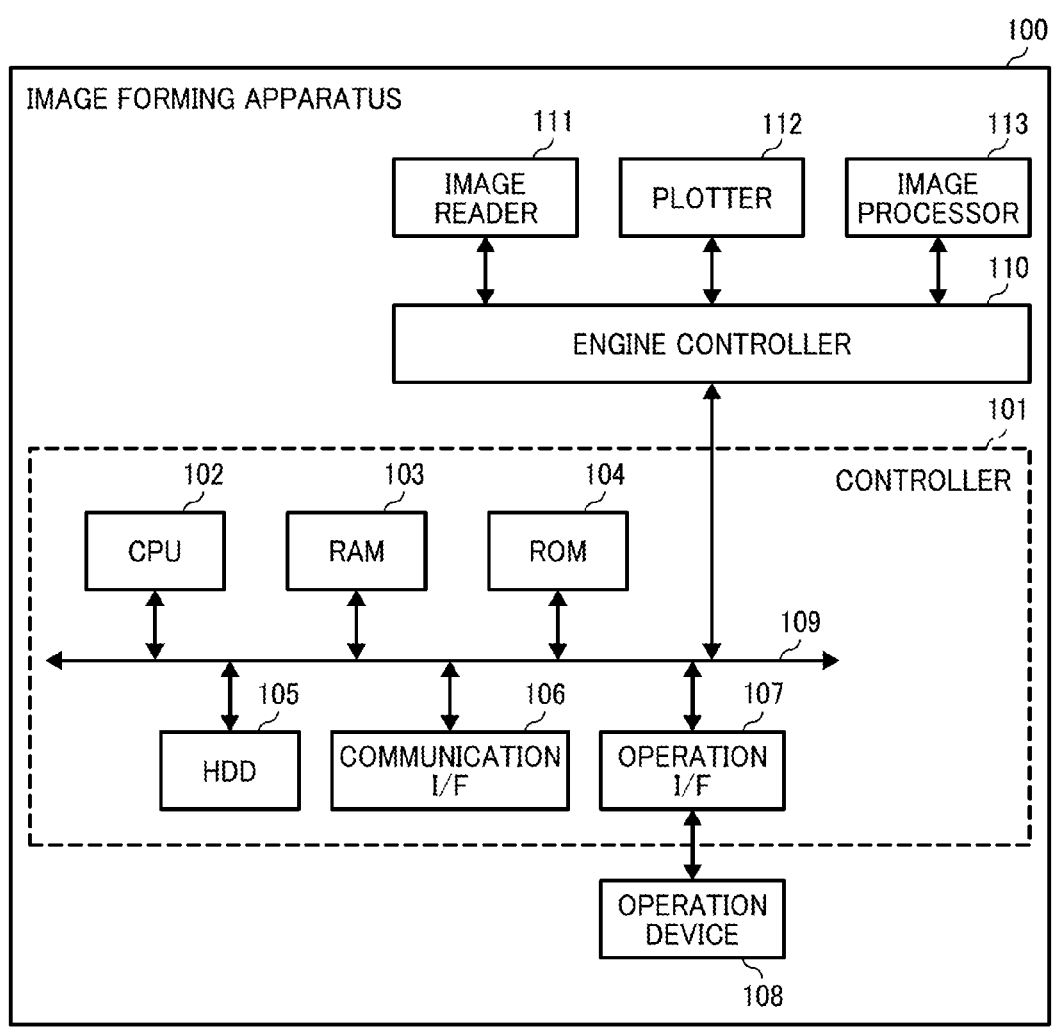
FIG. 1 is a block diagram illustrating a hardware configuration of an image forming apparatus including an image processing device according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

Embodiments of the disclosure will now be described with reference to the accompanying drawings. FIG. 1 is a block diagram illustrating a hardware configuration of an image forming apparatus 100 that includes an image processing device according to a first embodiment. The image forming apparatus 100 of FIG. 1 includes a controller 101, an engine controller 110, an image reader 111, an electrophotographic plotter (plotter) 112, and an image processor 113. The controller 101 includes a central processing unit (CPU) 102, a random access memory (RAM) 103, a read only memory (ROM) 104, a hard disc drive (HDD) 105, a communication interface (I/F) 106, and an operation interface (I/F) that is connected to an operation device 108. The above-mentioned elements are connected to each other via a system bus 109.

The controller 101 includes a microcomputer. The CPU 102 executes an image processing program stored in the ROM 104 or the HDD 105 with the RAM 103 serving as a work area, and controls the entire image forming apparatus 100 accordingly. The controller 101 also provides other various functions of the image processing device according to the embodiments of the disclosure, which will be described later. The ROM 104 and the HDD 105 are non-volatile storage medium, and store various types of program executed by the CPU 102 and various types of fixed data. The communication I/F 106 is an interface that connects the image forming apparatus 100 with a network, such as the Internet.

The operation I/F 107 connects the operation device 108 to the system bus 109 and thereby enables the CPU 102 to control the operation device 108. The operation device 108 is a user interface that includes an operation unit including keys, buttons, and touch sensors configured to receive instructions for operation from a user and a display unit such as a display screen configured to present information to the user.

The image reader 111 has a function to read an image of a document and acquire image data. The plotter 112 is an electrophotographic image forming unit that forms an image on an output sheet (a sheet of paper) based on the image data read by the image reader 111 or the image data input from the outside via the communication I/F 106, and outputs the sheet from the printer. (Hereinafter, to form an image on an output sheet and to output the output sheet from the image forming apparatus 100 may be expressed as "print out".) The plotter 112 corresponds to a printer output unit 6 in FIG. 2, which will be described later.

The image processor 113 performs image processing, as described later, on the image data, which is read by the image reader 111 or input from the outside. Not only the image processor 113 implements the functions of the image processing device according to the embodiment, but also the CPU 102, the RAM 103, the ROM 104, and the HDD 105, which are included in the controller 101, and the engine controller 110 implement the functions of the image processing device according to the embodiments.

The engine controller 110 controls the image reader 111, the plotter 112, and the image processor 113 according to a command received from the CPU 102 through the system bus 109. The image forming apparatus 100 may include, for example, a copier, a printer, a facsimile machine, and a digital multifunction peripheral.

Figure 2:
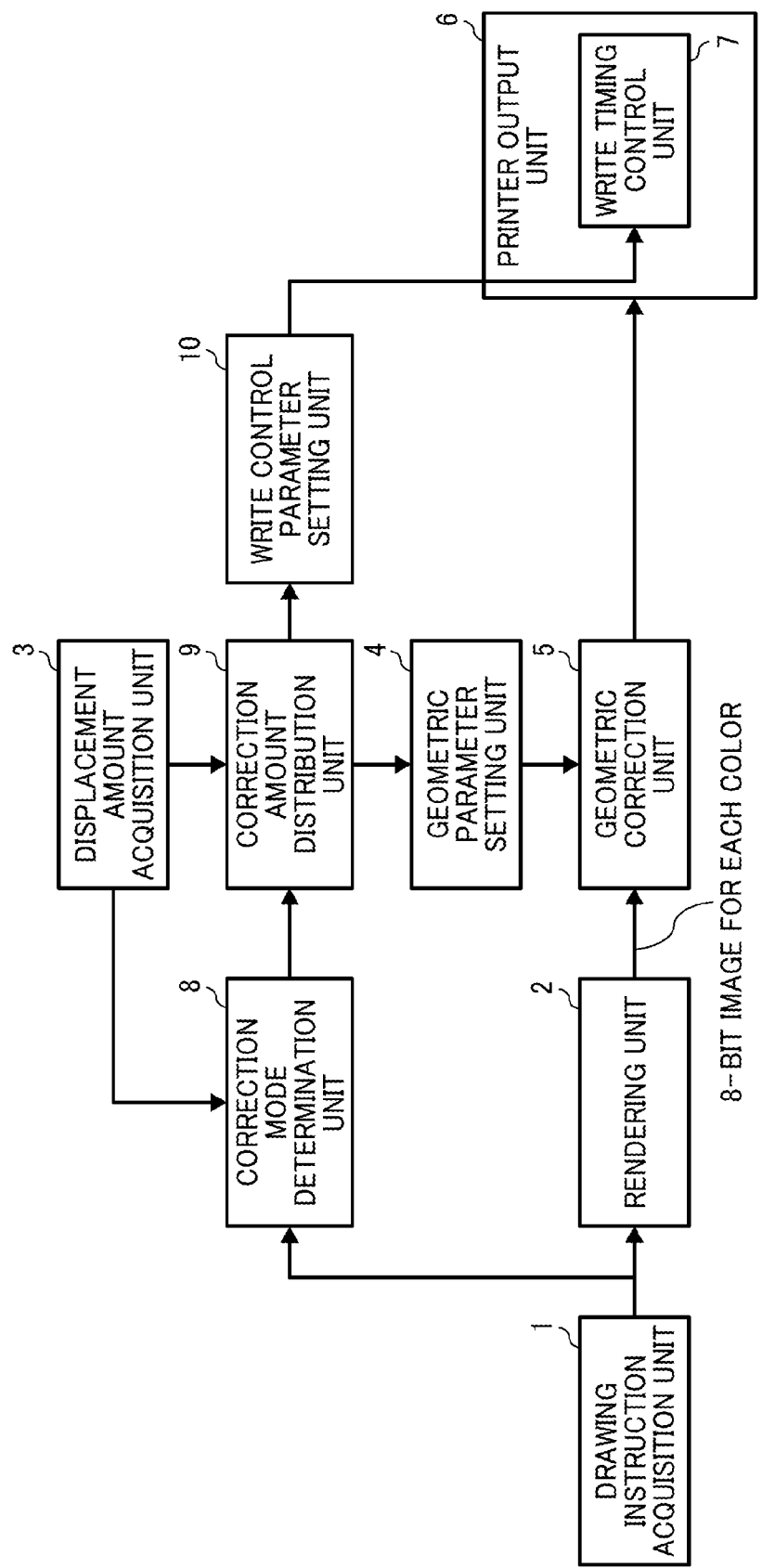
FIG. 2 is a block diagram illustrating a functional configuration of an image processing device according to a first embodiment.

Now, a functional configuration of the image processing device according to the first embodiment of the disclosure is described with reference to FIG. 2. FIG. 2 is a block diagram illustrating a functional configuration of the image processing device. The image processing device includes a drawing instruction acquisition unit 1, a rendering unit 2, a displacement amount acquisition unit 3, a geometric correction parameter setting unit 4, a geometric correction unit 5, and the printer output unit 6. The printer output unit 6 corresponds to the plotter 112 illustrated in FIG. 1 and includes a write timing control unit 7 that controls write timing (when to write the image on the output sheet). The image processing device further includes a correction mode determination unit 8, a correction amount distribution unit 9, and a write control parameter setting unit 10. The functions of the above-mentioned elements of the image processing device, except for the printer output unit 6, are implemented by the controller 101, the engine controller 110, and the image processor 113 illustrated in FIG. 1.

The drawing instruction acquisition unit 1 acquires an input image described in a page description language. The drawing instruction acquisition unit 1 also acquires instructions that each reflect a result of selection selected from various options by the user. The options include, for example, simplex printing or duplex printing, and whether to print registration (register) marks for cutting (trimming) at corners of the output sheet. The "registration mark" may also be referred to as a registration (register) index. The registration marks are placed, for example, at the four corners of a paste-up sheet to indicate cutting positions for a finished size of the output sheet or to be used for color registration.

The rendering unit 2 renders page description language commands acquired by the drawing instruction acquisition unit 1, and converts the rendered page description language commands into a bitmap image having a plurality of pixels. Graduation values of different colors of the bitmap image are each 8 bits. At this time, the rendering unit 2 also renders object information such as characters, lines, graphics, and images included in the input image and adds the rendered object information to the bitmap image pixel-by-pixel.

The displacement amount acquisition unit 3 measures a change in positions of four coordinates points at the four corners (that is, an amount of displacement) occurring between the input image and an output image, when the image is printed out without any corrections, including a geometric correction and a correction by controlling write timing. (Hereinafter, a printing defect including misregistration, distortion or any other kinds of difference occurring between the input image and the output image, namely an image is not printed at the position where the image were intended to may be referred to as displacement.) In measuring the amount of displacement, the displacement amount acquisition unit 3 acquires coordinates of four points of the input image, which are four correct (target) coordinate points, (four sets of correct coordinates, or target coordinates) and coordinates of four points of the output image, which are four correction target points, (four sets of correction target coordinates). The acquired coordinates are included in coordinate data. To measure the amount of displacement, measurement marks each indicating the coordinate point to be measured are printed in the four corners on the both side of a front side and a back side of the output sheet. For this measurement, a method using a sensor built in the device to automatically measure the measurement marks or a method using a ruler to manually measure the measurement marks printed on the output sheet (medium) and then inputting results of measurement may be used.

The geometric correction parameter setting unit 4 calculates and sets a geometric parameter based on the coordinate data which is based on the coordinates acquired by the displacement amount acquisition unit 3 and which is distributed to the geometric correction parameter setting unit 4 by the correction amount distribution unit 9. The geometric correction unit 5 uses the correction parameter, which is calculated by the geometric correction parameter setting unit 4, to correct the input image according to the amount of displacement. The amount of displacement defined by an amount of mismatch between each of the four target coordinate points and each corresponding point of the four correction target coordinate points of the output sheet. The geometric correction unit 5 performs image processing and corrects the input image (bitmap image) received from the rendering unit 2 according to the amount of displacement. That is, the geometric correction unit 5 corrects the input image using the geometric parameter calculated by the geometric correction parameter setting unit 4 based on prediction of the displacement or distortion of the output image from projection transformation.

Figure 3A:
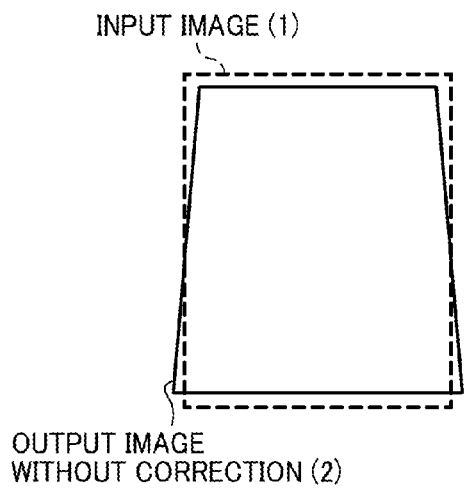
FIGS. 3A and 3B are diagrams for explaining an example of a geometric correction performed on a displacement of an image by a geometric correction unit of FIG. 2.

Now, the geometric correction, which is performed in the embodiment, on the disortion of the image is explained with reference to FIGS. 3A and 3B. Referring to FIG. 3A, an input image (1) is indicated by a dashed line, and an output image without correction (2) is indicated by a solid line. The output image without correction (2) illustrates an example of the displacement of the image occurring when the input image (1) is printed out without correction.

Figure 3B:
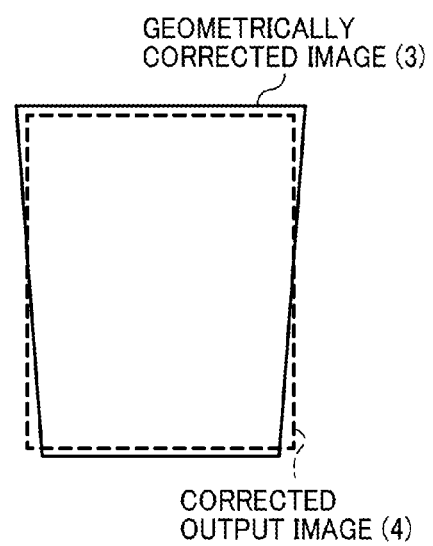

Referring to FIG. 3B, a corrected output image (4) is indicated by a dashed line, and a geometrically corrected image (3) is indicated by a solid line. Here, an inverse correction is applied to the geometrically corrected image (3) by predicting the displacement of the image. With the geometric correction performed to the geometrically corrected image (3), the output image (4) can be the same with the input image (1).

For example, in a case of a front-to-back displacement (here, the displacement occurs only on the back side and no displacement occurs on the front side when the printing is performed), the input image (1) corresponds to an image on the front side, and the output image (2) corresponds to an output image on the back side to which no geometric correction is performed. Additionally, the geometrically (inversely) corrected image (3) corresponds to an image on the back side to which the geometric correction is performed, and the output image (4) corresponds to a printer-output image of the geometrically corrected image (3). In the embodiment, the displacement amount acquisition unit 3 acquires coordinates of the four corners of the input image (1) and coordinates of the four corners of the output image (2), which are coordinate data. The geometric correction parameter setting unit 4 then calculates and sets the geometric parameter by predicting the displacement of the image occurring when the image is printed out and performing the inverse correction based on the coordinate data of the input image (1) and the output image (2). Subsequently, the geometric correction unit 5 uses the geometric parameter to correct the image. This results in generating the geometrically corrected image (3).

More details of the functions of the image processing device illustrated in FIG. 2 are described with reference to FIGS. 4 to 8. The displacement amount acquisition unit 3 acquires the coordinate data including the target coordinates and the correction target coordinates. The coordinate data corresponds to coordinates of the registration marks each printed on the output sheet. For each corner, the registration mark is printed at a position inside from the corner of the output sheet for a predetermined length (approximately 0.39 inches). When the displacement amount acquisition unit 3 automatically calculates the amount of displacement using a sensor built in the device, the sensor disposed along a conveying path through which the sheet after fixing is conveyed is used. The output sheet shrinks as it is heated during fixing process so that the sensor sensing the registration marks on the sheet needs to be provided on the conveying path after a fixing unit for accurate measurement of the amount of displacement.

Figure 4:
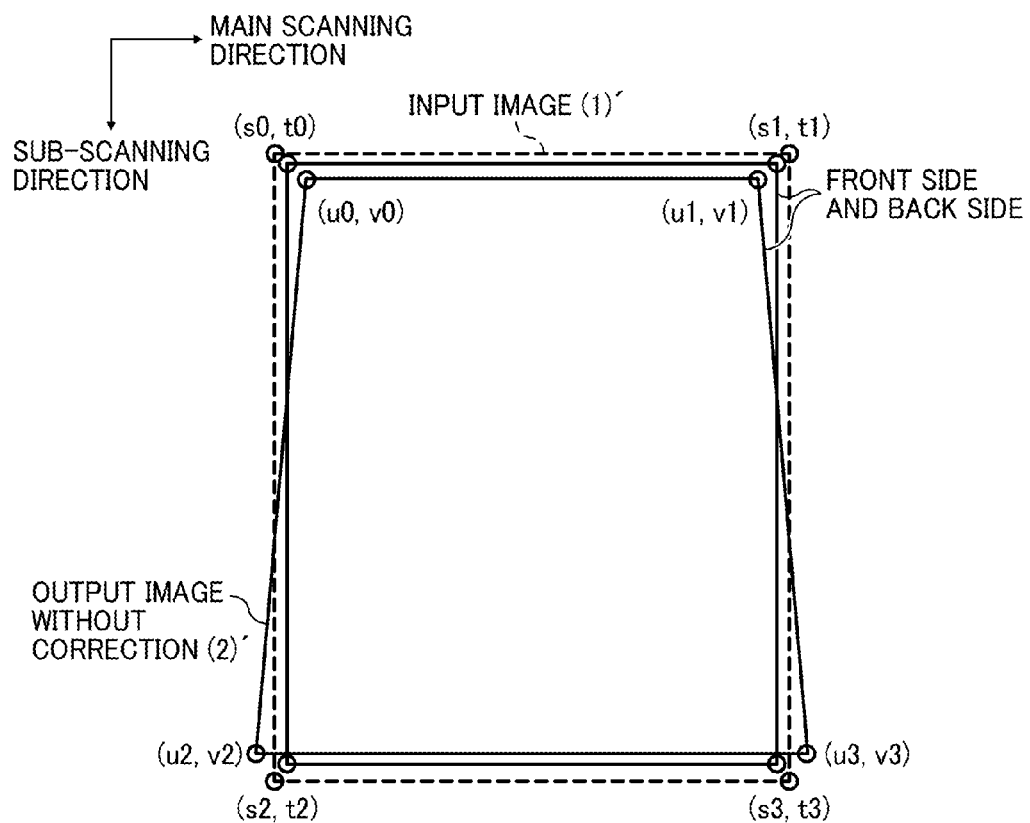
FIG. 4 is a diagram for explaining an example of coordinate data acquired by a displacement amount acquisition unit of FIG. 2.

FIG. 4 is a diagram for explaining an example of the coordinate data acquired by the displacement amount acquisition unit of FIG. 2. Here, in a case of the front-to-back displacement with the duplex printing, only the image on the back side is shifted or distorted. In FIG. 4, the coordinate points in the four corners of an input image (1)' (correct coordinates or target coordinates) are (s0, t0), (s1, t1), (s2, t2), and (s3, t3). A dashed line in FIG. 4 indicates the input image (1)'. Here, the target coordinates in a main scanning direction are indicated using s0 to s3, and the target coordinates in a sub-scanning direction are indicated using t0 to t3 as described above. Regarding the simplex printing, an output image without correction of the front side corresponds to an output image without correction (2)' indicated by a solid line in FIG. 4 associated with the input image (1)'. In the case of the front-to-back displacement with the duplex printing, an output image of the back side corresponds to the output image without correction (2)' associated with the input image (1)' that has the same coordinate with the output image of the front side indicated by another solid line in FIG. 4. The coordinates of the output image without correction (2)' (measured coordinates or correction target coordinates) are (u0, v0), (u1, v1), (u2, v2), and (u3, v3). Here, the correction target coordinates in the main scanning direction are indicated using u0 to u3, and the correction target coordinates in the sub-scanning direction are indicated using v0 to v3 as described above.

The amount of mismatch of each coordinate point at each four corner is namely, a difference between each of the correction target coordinates and the corresponding one of the target coordinates. The amount of displacement of the image in the main scanning direction is expressed as u0-s0, u1-s1, u2-s2, and u3-s3. The amount of displacement in the sub-scanning direction is represented as v0-t0, v1-t1, v2-t2, and v3-t3. When a value of the amount of displacement in the main scanning direction is a positive value, the correction target coordinates are shifted rightward from the target coordinates in FIG. 4. Otherwise being a negative value, the correction target coordinates are shifted leftward from the target coordinates in FIG. 4. When a value of the amount of displacement in the sub-scanning direction is the positive value, the correction target coordinates are shifted upward from the target coordinates. Otherwise being the negative value, the correction target coordinates are shifted downward from the target coordinates.

The correction mode determination unit 8 of FIG. 2 selects and determines a correction mode based on at least the amount of displacement acquired by the displacement amount acquisition unit 3. The correction mode determination unit 8 selects and determines one of a first correction mode and a second correction mode, as the correction mode, based on the amount of displacement acquired by the displacement amount acquisition unit 3, when the image is printed out. With the first correction mode, the geometric correction unit 5 corrects the image in both of the main scanning direction and the sub-scanning direction. With the second correction mode, the geometric correction unit 5 corrects the image in the sub-scanning direction and the write timing control unit 7 controls write timing to correct the image in the main scanning direction.

The amount of displacement of the image is equal to an amount of shift in the main scanning direction and shift in the sub-scanning direction, and defined based on the coordinate data including coordinates of the four coordinate points of the input image (target coordinates) and the output image (correction target coordinates), which is acquired by the displacement amount acquisition unit 3. The correction mode determination unit 8 may determine the correction mode according to instructions acquired by the drawing instruction acquisition unit 1, which indicate, for example, the simplex printing or the duplex printing, and whether to print the registration marks for cutting at the corners of the output sheet.

The write control parameter setting unit 10 of FIG. 2 calculates write control parameters that are used to control the write timing to perform a correction to the image according to the amount of displacement. The calculation is based on the amount of displacement acquired by the displacement amount acquisition unit 3. The correction amount distribution unit 9 receives the amount of displacement from the displacement amount acquisition unit 3 and distributes coordinate data that is based on the received amount of displacement to the geometric correction parameter setting unit 4 and the write control parameter setting unit 10. The coordinate data distributed by the correction amount distribution unit 9 includes the coordinates of the four target coordinate points and the four correction target coordinate points.

When the correction mode determination unit 8 selects and determines the first correction mode, the geometric correction unit 5 performs the correction processing to the input image in both of the main scanning direction (in both of a right direction and a left direction of the input image) and the sub-scanning direction (in both of an upward direction and a downward direction of the input image). That is, the correction amount distribution unit 9 distributes the coordinate data, which is based on the coordinates acquired by and received from the displacement amount acquisition unit 3, to the geometric correction parameter setting unit 4 and the write control parameter setting unit 10 in a manner that the geometric correction unit 5 corrects the input image in both direction.

Alternatively, when the correction mode determination unit 8 selects and determines the second correction mode, the write timing control unit 7 performs the correction processing to the input image in the main scanning direction, and the geometric correction unit 5 performs the correction processing to the input image in the sub-scanning direction. That is, the correction amount distribution unit 9 distributes the coordinate data, which is based on coordinates acquired by and received from the displacement amount acquisition unit 3 to the geometric correction parameter setting unit 4 and the write control parameter setting unit 10, individually, in a manner that the geometric correction unit 5 and the write timing control unit 7 perform the above-mentioned correction.

The write timing control unit 7 of the printer output unit 6 adjusts a write start position and a write clock cycle in the main scanning direction for performing the correction processing based on the write control parameters calculated by the write control parameter setting unit 10 based on the coordinate data distributed by the correction amount distribution unit 9. This correction is, namely, performed by electric control.

The correction amount distribution unit 9 receives an input signal (bit signal of "0" or "1") indicating the result of determination of the correction mode determination unit 8. An example of a process performed by the correction amount distribution unit 9 is explained with reference to FIG. 5. The correction amount distribution unit 9 distributes to the geometric correction parameter setting unit 4, coordinate data 120, which are surrounded by a dashed line in FIG. 5, when receiving the signal of "0" indicating that the correction mode determination unit 8 selects and determines the first correction mode. The correction amount distribution unit 9 also distributes coordinate data 121 to the write control parameter setting unit 10. The coordinate data 121 includes the coordinates of the four target coordinate points and the four correction target coordinate points, which are also surrounded by another dashed line in FIG. 5.

That is, the geometric correction parameter setting unit 4 receives the coordinate data 120 acquired by the displacement amount acquisition unit 3 in a state as the coordinate data is acquired, and the geometric correction unit 5 corrects the all of the displacement. Whereas the write control parameter setting unit 10 receives the coordinate data 121 in which the target coordinates and the correction target coordinates are the same (the amount of displacement is zero) and thereby the correction performed by the write timing control unit 7 of the printer output unit 6 is substantially disabled. When the above-mentioned geometric correction is performed to the image of the front side, the correction target coordinates corresponds to the coordinate data of the front side that is acquired by the displacement amount acquisition unit 3. Alternatively, when the geometric correction is performed to the image of back side, the correction target coordinates corresponds to the coordinate data of the back side that is acquired by the displacement amount acquisition unit 3.

When receiving the signal of "1" indicating that the correction mode determination unit 8 selects and determines the second correction mode, the correction amount distribution unit 9 distributes the coordinate data 122, which are surrounded by still another dashed line in FIG. 5, to the geometric correction parameter setting unit 4. In addition to that the correction amount distribution unit 9 distributes to the write control parameter setting unit 10, the coordinate data 123, which are surrounded by still another dashed line in FIG. 5.

That is, the geometric correction parameter setting unit 4 receives the coordinate data 122 that includes a part of data indicating each of the coordinates in the sub-scanning direction in a state as the coordinate data is acquired by the displacement amount acquisition unit 3, and the other part of data indicating each of the coordinates in the main scanning direction in which each target coordinate and the corresponding correction target coordinate are the same. This substantially disables the geometric correction unit 5 to correct the image in the main scanning direction, and thus the geometric correction unit 5 corrects the image only in the sub-scanning direction. In contrast, the write control parameter setting unit 10 receives the coordinate data 123 including a part of data indicating each of the coordinates in the main scanning direction in a state as the coordinate data is acquired by the displacement amount acquisition unit 3, and the other part of data indicating the coordinates in the sub-scanning direction in which the target and the correction target are the same. This substantially disables the write timing control unit 7 of the printer output unit 6 to correct the image in the sub-scanning direction, and thus the write timing control unit 7 corrects the image only in the main scanning direction.

Now, a supplementary explanation for the write control parameter setting unit 10 and write timing control unit 7 is given below. The write timing control unit 7 in the embodiment is substantially enabled only when the write control parameter setting unit 10 receives the coordinate data 123 in FIG. 5. The write control parameter setting unit 10 sets a write start parameter Q and a write scale parameter P for each line. The write start parameter Q indicates a position to start writing each line. The write scale parameter P indicates how each line is rescaled to be written.

The write control parameter setting unit 10 applies the following formula to set the write start parameter Q for a coordinate in the sub-scanning direction T.

$$Q=\{(u2-s2)-(u0-s0)\}\times(T-t0)/(t2-t0)+(u0-s0)$$

With the above-mentioned formula, the write start parameter Q for the line having the coordinate t0 in the sub-scanning direction is u0-s0 and the write start parameter Q for the line having the coordinate t2 in the sub-scanning direction is u2-s2.

The write timing control unit 7 controls the write timing by reflecting the write start parameter Q in a manner that if Q<0, the write start position is to come earlier than an original write start position by the value of Q, and if Q>0, the write start position is to come later than the original write start position by the value of Q. Here, the original write start position corresponds to a write start position used in the case where the input image is printed out without the correction. If Q=0, the write start position remains the default, or the original write position. The write control parameter setting unit 10 applies the following formula to set the write scale parameter P for the coordinate in the sub-scanning direction T.

$$P=\{(u2-u3)/(s2-s3)-(u0-u1)/(s0-s1)\}\times(T-t0)/(t2-t0)+(u0-u1)/(s0-s1)$$

With the above-mentioned formula, the write scale parameter P for the line having the coordinate t0 in the sub-scanning direction is (u0-u1)/(s0-s1), and the write scale parameter P for the line having the coordinate t2 in the sub-scanning direction is (u2-u3)/(s2-s3).

The write timing control unit 7 controls the write clock cycle by reflecting the write scale parameter P in a manner that if P<1, the line to be written is decreased by the rate of the value of P in the main scanning direction, and if P>1, the line to be written is increased by the rate of the value of P in the main scanning direction. If P=1, the write rate remains to be the default value. The first correction mode, which is used to correct the image in both of the main scanning direction and the sub-scanning direction by geometric correction unit 5, can be applied to various types of shapes (has wide application in image correction function), however, may cause moire when the input image includes a binary image of an area gradation such as a shadowed graph.

The second correction mode, which substantially enables the write timing control unit 7 of the printer output unit 6 to correct the image, uses timing control and controls when to write each line using the write start parameter Q and the write scale parameter P as described above. Such control, namely an electric control, may cause a lack of accuracy. Regarding the registration correction, the magnification correction, and the skew correction of the image in the main scanning direction, such a lack of accuracy hardly occurs. On the contrary, regarding a trapezoidal distortion correction that changes a rescale rate for each line, the lack of accuracy may often occur. The moire, however, does not occur in principle with the electric control.

FIG. 6 is a table for explaining an example of how the correction mode is selected by reflecting types of correction and types of instruction, including instruction for cutting or no-cutting and instruction for simplex printing or duplex printing, received from the user. In FIG. 6, rectangles illustrated with dashed lines in a section of the types of correction are the input images each corresponding to the input image (1)' of FIG. 4, and quadrilaterals illustrated with solid lines are output images each corresponding to the output image without correction (2)' of FIG. 4.

The registration correction is performed when a shape and a size of the output image are the same with that of the input image, and a position of the output image is shifted in a horizontal direction (main scanning direction) and/or a vertical direction (sub-scanning direction) in relation to the input image. The magnification correction is performed when the shape of the output image is the same with that of the input image, but the size of the output image is different from that of the input image. The skew correction is performed when the sizes of the output image and the input image are the same, and two sides facing each other of the output image are in parallel but an angle between a long side and a short side is not 90 degrees. The trapezoidal distortion correction is performed when a shape of the output image is trapezoidal.

As illustrated in FIG. 6, when the type of correction according to the amount of displacement is not any of the registration correction, the magnification correction, and the skew correction, nor any combination thereof, the correction mode determination unit 8 selects the first correction mode by placing primary importance on the correction function and avoiding the lack of accuracy. In short, the correction mode determination unit 8 selects the first mode when the type of correction is the trapezoidal distortion correction or "other correction". The "other correction" in FIG. 6 does not include the above-mentioned skew correction or the trapezoidal distortion correction, but includes, for example, a correction for a quadrilateral shape of which neither left and right sides nor top and bottom sides are in parallel, as illustrated by the solid line as one example of "other correction" in FIG. 6. With the first correction mode, the geometric correction unit 5 corrects the image in both of the main scanning direction and the sub-scanning direction. This correction is based on the prediction of the displacement or distortion of the output image from the projection transformation. The projection transformation for the correction can be applied to any type of quadrilateral shape.

When the type of correction according to the amount of displacement is one of the registration correction, the magnification correction, and the skew correction, or any combination thereof, the correction mode determination unit 8 can select the second correction mode. As illustrated in the example of FIG. 6, the correction mode determination unit 8, selects the first correction mode or the second correction mode according to presence or absence of the drawing instruction indicated by the registration marks for cutting from the user. The correction mode determination unit 8 selects the first correction mode, by placing primary importance on the position accuracy, when the registration marks for "cutting" are drawn in the corners of the output sheet. Selecting the first correction mode for the image with registration marks for cutting can provide the output image with high position accuracy that is strictly required to the instruction for cutting and suitable for the output sheet to be cut.

In the example illustrated in FIG. 6, the correction mode determination unit 8 selects the first correction mode or the second correction mode according to the instruction indicating the simplex printing or the duplex printing from the user. The correction mode determination unit 8 selects the first correction mode in response to the instruction indicating the duplex printing. Selecting the first correction mode for the duplex printing can provide the output image with the position accuracy that is relatively high to the instruction indicating the duplex printing.

Thus, in the example as illustrated in FIG. 6, the correction mode determination unit 8 selects the second correction mode only in a condition that the type of correction is any one of the registration correction, the magnification correction, and the skew correction, or any combination thereof, there is no instruction for cutting, namely no registration marks are printed on the output sheet (no cutting), and there is the instruction indicating the simplex printing. That is, the second correction mode, which also provides the correction function and hardly cause the moire, is preferably selected when the importance of the position accuracy is relatively low.

The determination for the type of correction (function) according to the amount of displacement is based on a value of the write scale parameter P of the line of T=t0 and another value of the write scale parameter P of the line of T=t2, which are respectively (u0-u1)/(s0-s1) and (u2-u3)/(s2-s3). When the values of the write scale parameter P of the line of T=t0 and the line of T=t2 have the same values, the correction mode determination unit 8 can determine the type as one of the registration correction, the magnification correction, and the skew correction, or any combination thereof. Otherwise, the correction mode determination unit 8 can determine one of the other types of correction (including the trapezoidal distortion correction).

The correction mode determination unit 8 also selects the correction mode by reflecting the type of correction (function) for each of the front side and the back side. In the first embodiment, only when the simplex printing is instructed and the geometric correction is performed to the image of the front side, the correction mode determination unit 8 determines the type of correction based on the target coordinates of the input image (1)' of FIG. 4 and the correction target coordinates of the output image (2)' of FIG. 4 (in this case, the measured coordinates of the front side), and then switches the correction mode according to the determined type of correction.

The operation performed by a computer of the image processing device according to the first embodiment will be briefly described with reference to a flowchart of FIG. 7. The computer in the embodiment corresponds to the controller 101 configuring a microcomputer in the image forming apparatus 100. The controller 101 controls the engine controller 110 and image processor 113 to perform the process described in FIG. 7. In the following description, the controller 101 is referred to as the "computer" to explain the operation.

Figure 7:
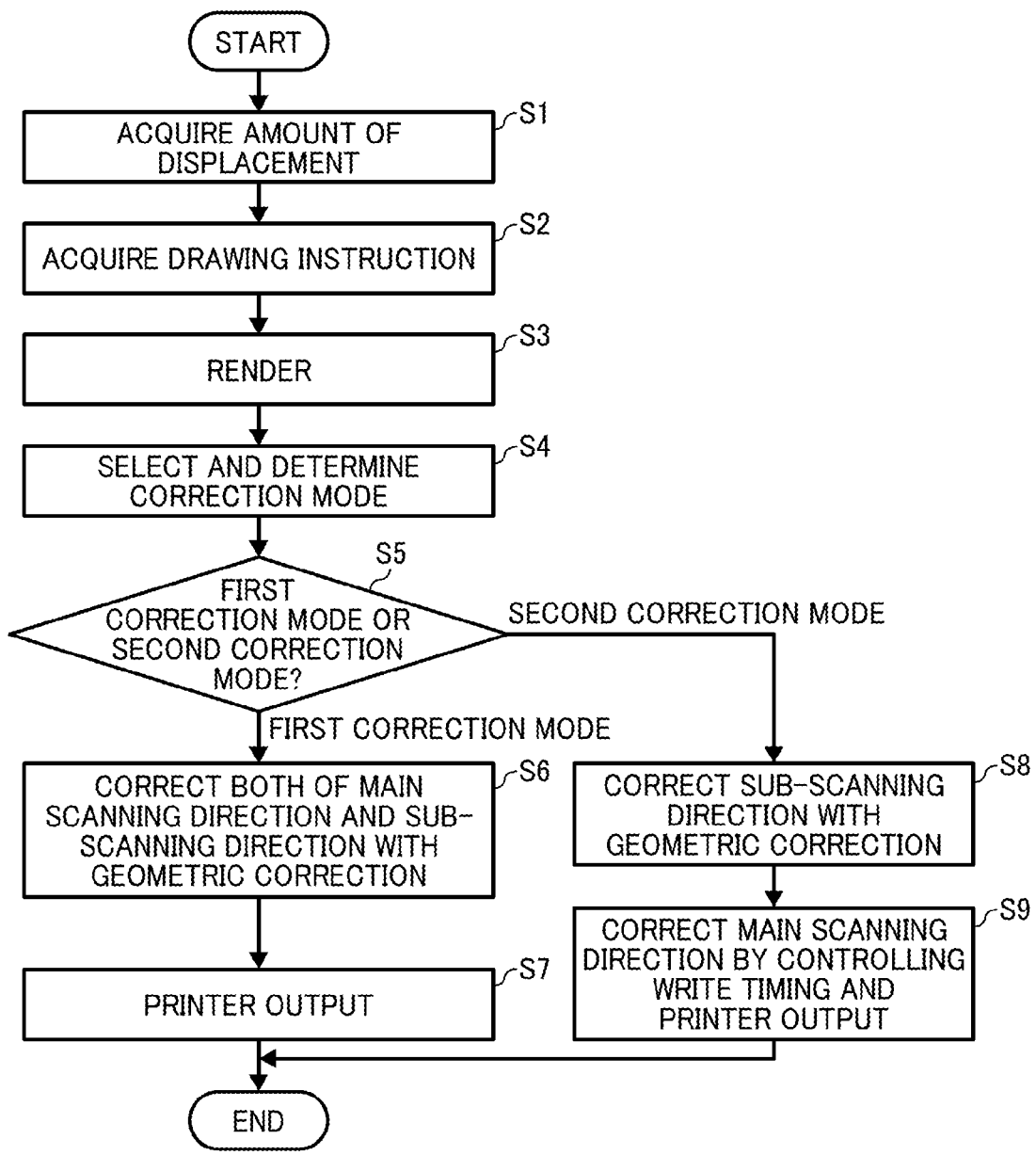
FIG. 7 is a flowchart illustrating an operation of the image processing device according to the first embodiment when functions of the image processing device are implemented by a computer.

When the computer starts the process described in the flowchart of FIG. 7, the computer acquires the amount of displacement at S1. The computer further acquires the drawing instructions indicating for cutting or no cutting and for simplex printing or duplex printing along with the input image at S2. The above mentioned steps of S1 and S2 are not limited to this order, but any one of S1 and s2 can be the first step to start the process.

The computer renders and converts the input image described in the page description language into the bitmap image at S3. The computer, at S4, selects and determines the correction mode based on the amount of displacement obtained as described above. In selecting and determining the correction mode, the drawing instructions indicating for cutting or no cutting, and for the simplex printing or the duplex printing can also be reflected as described above.

In S5, the computer continues the process based on a result of the determination at S4. The process continues to S6 if the result of the determination is the first correction mode, and the process proceeds to S8 if the result of the determination is the second correction mode. In S6, the computer corrects the image in both of the main scanning direction and the sub-scanning direction, and prints out (forms the image on the output sheet and output the output sheet) in S7 to complete the process. In S8, the computer corrects the image in the sub-scanning direction by geometric correction, and then corrects the image in the main scanning direction by controlling the write timing and then prints out (forms the image on the output sheet and output the output sheet) in S9 to have the process completed.

With the second correction mode, the above-mentioned embodiment performs the geometric correction to the image in the sub-scanning direction, and corrects the image in the main scanning direction by controlling the write timing. Alternatively, the embodiment may perform the geometric correction to the image in the main scanning direction and corrects the image in the sub-scanning direction by controlling the write timing.

For this situation, the correction amount distribution unit 9 distributes the correction amount as described below in response to receiving the signal of "1" indicating that the correction mode determination unit 8 selects the second correction mode. The correction amount distribution unit 9 distributes the coordinate data 123 of FIG. 5 to the geometric correction parameter setting unit 4, and the coordinate data 122 of FIG. 5 to the write control parameter setting unit 10. The coordinate data includes each of the coordinates of the four target coordinate points and the four correction target coordinate points.

That is, the geometric correction parameter setting unit 4 receives the coordinate data 123 including the part of data indicating each of the coordinates in the main scanning direction in a state as the coordinate data is acquired by the displacement amount acquisition unit 3, and the other part of data indicating the coordinates in the sub-scanning direction in which the target and the correction target are the same. This substantially disables the geometric correction unit 5 to correct the image in the sub-scanning direction, and thus the geometric correction unit 5 corrects the image only in the main scanning direction.

In contrast, the write control parameter setting unit 10 receives the coordinate data 122 that includes the part of data indicating each of the coordinates in the sub-scanning direction in a state as the coordinate data is acquired by the displacement amount acquisition unit 3, and the other part of data indicating each of the coordinates in the main scanning direction in which each target coordinate and the corresponding correction target coordinate are the same. This substantially disables the write timing control unit 7 of the printer output unit 6 to correct the image in the main scanning direction, and thus the write timing control unit 7 corrects the image only in the sub-scanning direction. The write timing control unit 7 can perform the correction of the image in the sub-scanning direction by, for example, controlling a rotation speed of a photoreceptor drum that is an object to be written.

Figure 8:
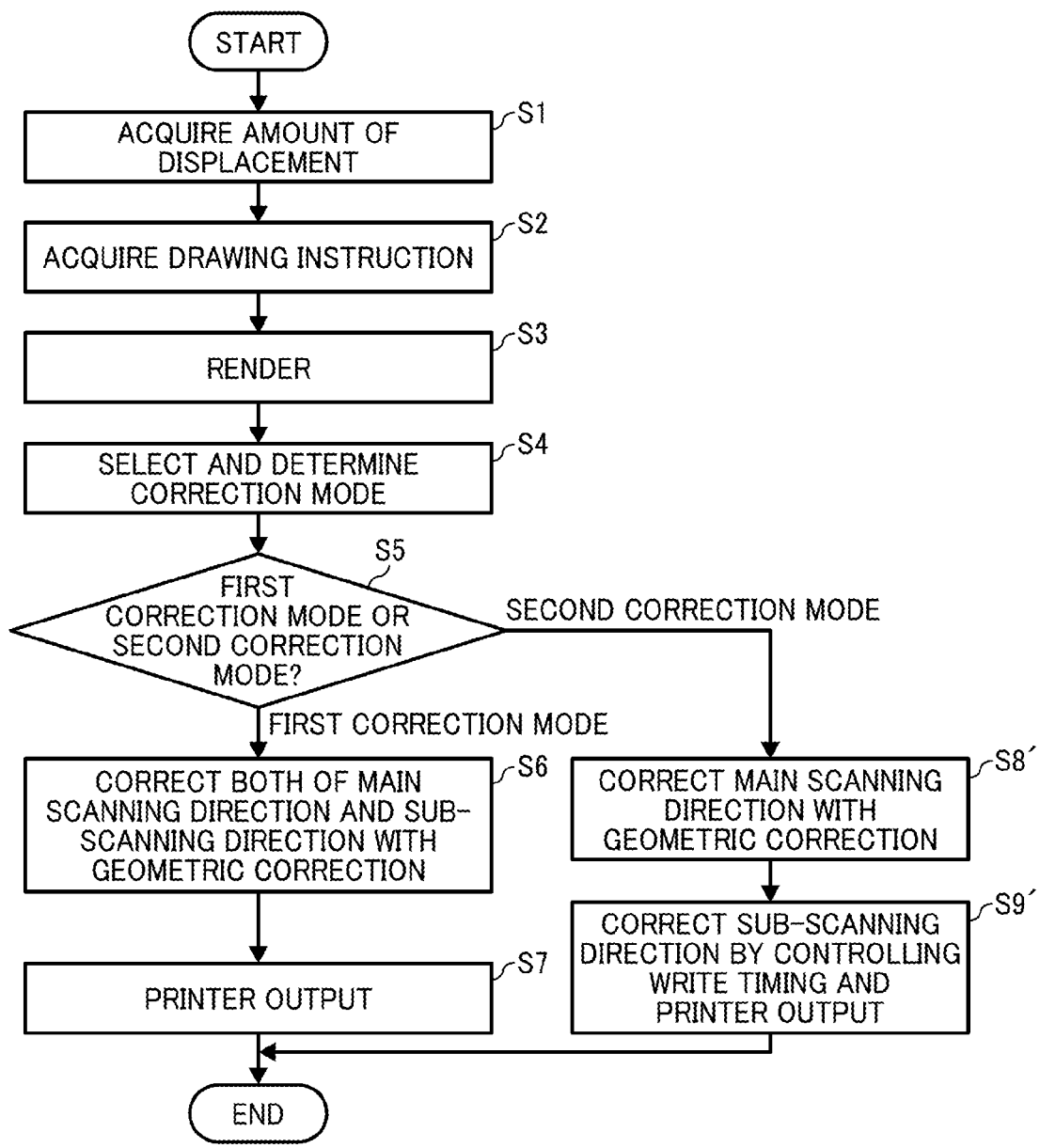
FIG. 8 is a flowchart illustrating another operation of the image processing device according to the first embodiment when a part of the functions of the image processing device is changed and the functions are implemented by the computer.

FIG. 8 is another flowchart illustrating the operation performed by the computer of the image processing device according to the first embodiment, when a part of the functions is changed in a manner that the computer performs the geometric correction in the main scanning direction and corrects the image in the sub-scanning direction by controlling the write timing as described above. The flowchart of FIG. 8 is different from the flowchart of FIG. 7 in a part of the process after the computer determines and selects the second correction mode at S5, namely, S8' and S9' in FIG. 8 is different from S8 and S9 in FIG. 7. The other steps in FIG. 7 and the corresponding steps in FIG. 8 are the same with each other and the description thereof is omitted below.

In the following description, the controller 101 is referred to as the "computer" as well.

In S8' of FIG. 8, the computer performs the geometric correction of the image in the main scanning direction. In S9' the computer corrects the image in the sub-scanning direction by controlling the write timing and prints out (forms the image on the output sheet and output the output sheet), and then the process is completed. In short, the image processing device according to the embodiment can correct the image by geometric correction in one direction (first direction) of the main scanning direction and the sub-scanning direction and corrects the image by controlling the write timing in the other direction (second direction) of the main scanning direction and the sub-scanning direction, in the second correction mode.

Thus, according to the embodiment, when the correction mode determination unit 8 selects the first correction mode, the correction amount distribution unit 9 of FIG. 2 distributes the coordinate data acquired by the displacement amount acquisition unit 3 to the geometric correction parameter setting unit 4 as is, and distributes the coordinate data having the target coordinates and the correction target coordinates that are the same to the write control parameter setting unit 10. This substantially disable the write timing control unit 7 to correct the input image.

Additionally, when the correction mode determination unit 8 selects the second correction mode, the correction amount distribution unit 9 distributes to the geometric correction parameter setting unit 4 the coordinate data including data indicating coordinates of one of the main scanning direction and the sub-scanning direction, which is a first direction, in a state as the coordinate data is acquired by the displacement amount acquisition unit 3. Regarding the coordinate data of the other one of the main scanning direction and the sub-scanning direction, which is a second direction, the correction amount distribution unit 9 distributes to the geometric correction parameter setting unit 4 the coordinate data in which the target and the correction target are the same. This substantially disables the geometric correction unit 5 to correct the image in the second direction.

The correction amount distribution unit 9 also distributes to the write control parameter setting unit 10 the coordinate data of the second direction in a state as the coordinate data is acquired by the displacement amount acquisition unit 3. Regarding the first direction, the correction amount distribution unit 9 distributes to the write control parameter setting unit 10 the coordinate data in which the target and the correction target are the same, and thus substantially disabling the write timing control unit 7 to correct the image in the first direction.

A method for processing an image according to the embodiment includes each of the steps described in the flowchart of FIG. 7 or FIG. 8. The method for processing the image according to the embodiment, however, may include at least steps of acquiring the amount of displacement (S1), performing the geometric correction (S6, S8, or S8'), controlling the write timing (S9 or S9'), and determining the correction mode (S4).

The non-transitory recording medium storing an image processing program according to one embodiment can cause the computer to execute each steps of the operation described in the flowchart of FIG. 7 or FIG. 8. The program according to the embodiment, however, may cause the computer to execute at least acquiring the amount of displacement (S1), performing the geometric correction (S6, S8, or S8'), controlling the write timing (S9 or S9'), and determining the correction mode (S4).

The nonvolatile memory such as the ROM 104 and the HDD 105 in the image forming apparatus 100 may store the program according to the embodiment. A removable or portable storage media such as a CD-ROM may also store the program and the image forming apparatus 100 may read the program from the removable or portable storage media and store the read program in the nonvolatile memory. Alternatively, the computer of the image forming apparatus 100 may download the program from an external server via the network such as the Internet.

Figure 9:
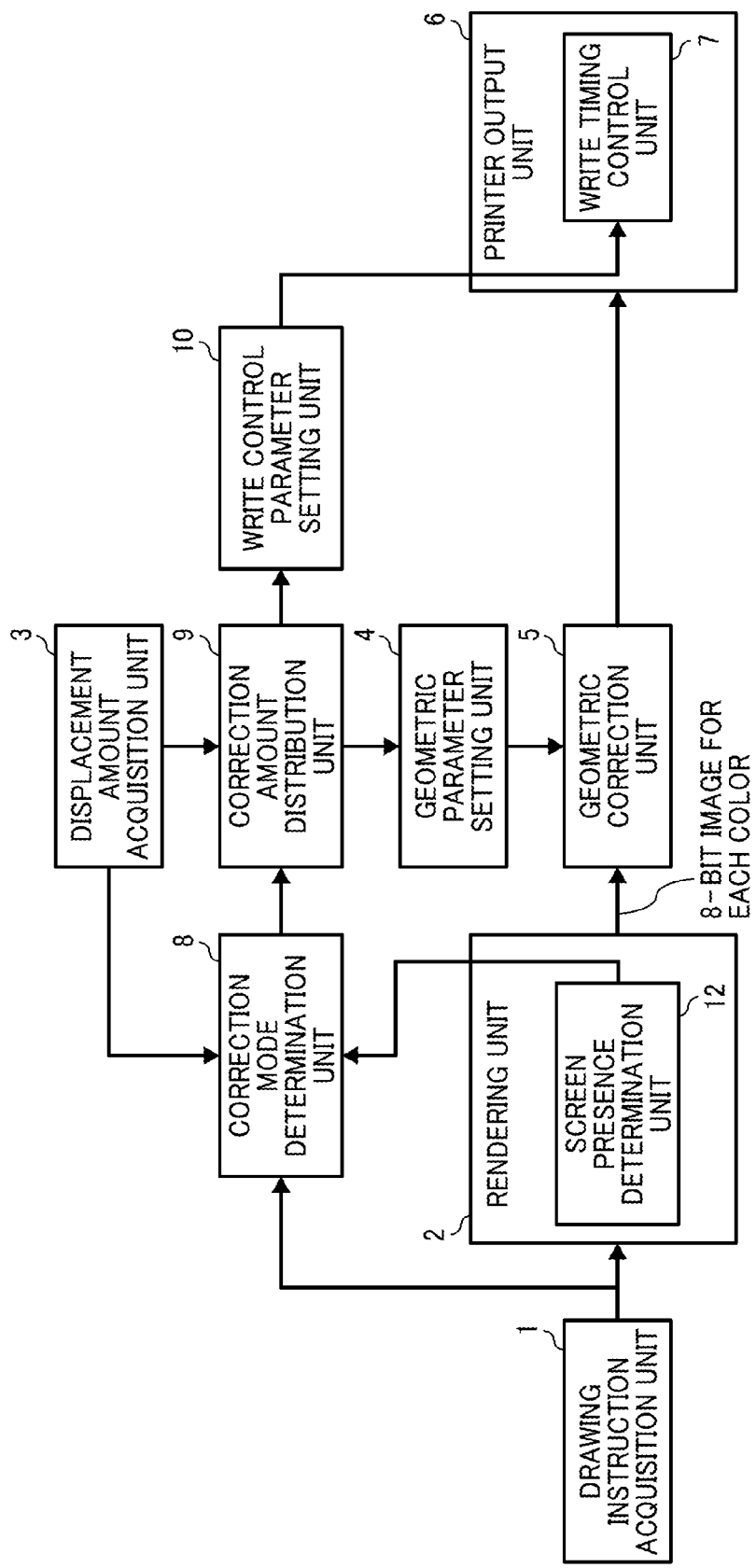
FIG. 9 is a block diagram illustrating a functional configuration of an image processing device according to a second embodiment.
Figure 10:
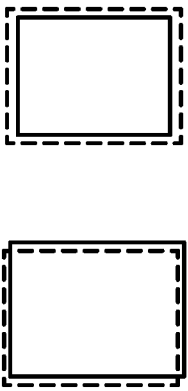
FIG. 10 is a table for explaining an example of how the correction mode is selected by a correction mode determination unit of FIG. 9.

Next, an image processing device according to a second embodiment will be described with reference to FIG. 9 and FIG. 10. FIG. 9 is a functional block diagram of the image processing device according to the second embodiment. An image forming apparatus including the image processing device according to the second embodiment has the same hard configuration as the one illustrated in FIG. 1. The image processing device according to the second embodiment is different from the image processing device according to the first embodiment in addition of a screen presence determination unit 12 in the rendering unit 2. With the image processing device according to the second embodiment, the correction mode determination unit 8 determines the correction mode in response to a result of determination of the screen presence determination unit 12, which is also different from the first embodiment.

The screen presence determination unit 12 determines whether the drawing instruction includes an instruction for generating a screen in the image. That is, the correction mode determination unit 8 determines the correction mode according to presence or absence of a screen in the input image. Another example of such determination method determines whether the screen is present by determining if the image after rendering has periodicity. As described in a table of FIG. 10, when a type of correction according to an amount of displacement is one of the registration correction, the magnification correction, and the skew correction or any combination thereof, and there is an instruction for no cutting, the image processing device further refers the result of determination of the screen presence determination unit 12. The correction mode determination unit 8 also reflects the result of the determination of the screen presence determination unit 12 to select one of the first correction mode and the second correction mode.

For example, if the input image has no screen, the correction mode determination unit 8 selects the first correction mode by giving a position accuracy the first priority, and if the input image has screen the correction mode determination unit 8 selects the second correction mode to prevent occurrence of moire. As described above, selecting the second correction mode for the input image having the screen can prevent the moire, and selecting the first correction mode for the input image having no screen can improve the position accuracy when the image is output on the sheet.

A flowchart describing the operation performed by a computer of the image processing device according to the second embodiment is almost the same with the flowchart illustrated in FIG. 7 or FIG. 8 and, so that, omitted here. The flowchart of the operation of the image processing device according to the second embodiment is different from the flowchart illustrated in FIG. 7 or FIG. 8 in adding a step of determining whether the drawing instructions includes the instruction that indicates for screen generating between S3 and S4. In addition to that, the correction mode determination unit 8 also reflects the result of determination of the screen presence to select the correction mode in S4.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims. For example the image processing device according to the embodiments of the disclosure can be employed with various types of image forming apparatus including a copier, a printer, a facsimile apparatus, and a digital multifunction peripheral (MFP).

What is claimed is:

1. An image processing device comprising:
a memory storing a program of instructions; and
a processor configured to execute the program of instructions to
acquire an amount of displacement of an input image, the displacement occurring when the input image is formed on a medium to be output from an image forming apparatus as an output image, the amount of displacement determined based on first coordinates of four corners of the input image and second coordinates of four corners of a non-corrected output image, and
apply image processing to the input image according to the amount of displacement to perform geometric correction of the input image received in the input image, the geometric correction including
performing inverse correction to generate a geometric correction parameter based on the amount of displacement of the input image, the first coordinates, and the second coordinates, and
adjusting a shape of the input image based on the geometric correction parameter to generate a geometrically corrected image with four corners having corrected coordinates, such that the geometrically corrected image, when formed on the medium to be output as a corrected output image, has four corners having coordinates corresponding to the first coordinates; and
an electrophotographic plotter configured to control write timing of the input image according to the amount of displacement to perform correction of the input image;
wherein the processor is further configured to execute the program of instructions to select one correction mode of a first correction mode and a second correction mode according to the amount of displacement, when the input image is to be formed on the medium to be output from the image forming apparatus, to cause the input image to be selectively corrected in both a first direction and a second direction based on the selected one correction mode, the selectively correcting including one of
the processor correcting the input image in both the first direction and the second direction through geometric correction, based on the selected one correction mode being the first correction mode, or
the processor correcting the input image in the first direction through geometric correction and the electrophotographic plotter correcting the input image in the second direction through controlling writing timing of the input image, based on the selected one correction mode being the second correction mode.

2. The image processing device of claim 1, wherein the processor is configured to execute the program of instructions to select the first correction mode based on a determination that the geometric correction is not any one or more of
a registration correction,
a magnification correction, and
a skew correction.

3. The image processing device of claim 1, wherein
the processor is configured to execute the program of instructions to select one correction mode of the first correction mode and the second correction mode according to a determination of whether a user instruction for thawing registration marks for cutting in addition to the amount of displacement is received.

4. The image processing device of claim 1, wherein
the processor is configured to execute the program of instructions to select one correction mode of the first correction mode and the second correction mode according to a user instruction indicating simplex printing or duplex printing in addition to the amount of displacement.

5. The image processing device of claim 1, wherein the processor is configured to execute the program of instructions to select one correction mode of the first correction mode and the second correction mode according to a determination of whether a screen in the input image in addition to the amount of displacement is present.

6. The image processing device of claim 1, wherein the amount of displacement is an amount of displacement in the first direction and the second direction.

7. The image processing device of claim 1, the processor further configured to execute the program of instructions to selectively distribute coordinate data based on the selected one correction mode, the coordinate data including the first coordinates of four corners of the input image and the second coordinates of four corners of the non-corrected output image, the selectively distributing including performing one of
based on the first correction mode being selected, calculating a write control parameter based on the first coordinates and the second coordinates being in a state as the coordinate data is received and further disabling correction to the input image by the electrophotographic plotter based on distributing first coordinates and second coordinates that are identical to each other, the write control parameter being used for the correction of the input image by controlling write timing, and
based on the second correction mode being selected, calculating the write control parameter based on the first coordinates and the second coordinates in the first direction being in the state as the coordinate data is received and the first coordinates and the second coordinates in the second direction being identical to each other and further disabling correction to the input image in the first direction by the electrophotographic plotter based on distributing first coordinates and second coordinates in the first direction that are identical to each other and first coordinates and second coordinates in the second direction that are in the state as the coordinate data is received.

8. An image forming apparatus comprising:
the image processing device of claim 7.

9. A method for processing an image, comprising:
acquiring an amount of displacement of an input image, the displacement occurring when the input image is formed on a medium to be output from an image forming apparatus as an output image, the amount of displacement determined based on first coordinates of four corners of the input image and second coordinates of four corners of a non-corrected output image;
selecting one correction mode of a first correction mode and a second correction mode according to the amount of displacement, when the input image is to be formed on the medium to be output from the image forming apparatus; and
selectively correcting the input image in both a first direction and a second direction based on the selected one correction mode, the selectively correcting including one of
  correcting the input image in both the first direction and the second direction based on applying a geometric correction, based on the selected one correction mode being the first correction mode, or
  correcting the input image in the first direction based on applying the geometric correction and further correcting the input image in the second direction based on controlling writing timing of the input image, based on the selected one correction mode being the second correction mode,
wherein the geometric correction includes
  performing inverse correction to generate a geometric correction parameter based on the amount of displacement of the input image, the first coordinates, and the second coordinates, and
  adjusting a shape of the input image based on the geometric correction parameter to generate a geometrically corrected image with four corners having corrected coordinates, such that the geometrically corrected image, when formed on the medium to be output as a corrected output image, has four corners having coordinates corresponding to the first coordinates.

10. The method of claim 9, further comprising:
selecting the first correction mode based on a determination that the geometric correction is not any one or more of
  a registration correction,
  a magnification correction, and
  a skew correction.

11. The method of claim 9, further comprising:
selecting one correction mode of the first correction mode and the second correction mode according to a determination of whether a user instruction for drawing registration marks for cutting in addition to the amount of displacement is received.

12. The method of claim 9, further comprising:
selecting one correction mode of the first correction mode and the second correction mode according to a user instruction indicating simplex printing or duplex printing in addition to the amount of displacement.

13. The method of claim 9, further comprising:
selecting one correction mode of the first correction mode and the second correction mode according to a determination of whether a screen in the input image in addition to the amount of displacement is present.

14. The method of claim 9, further comprising:
selectively distributing coordinate data based on the selected one correction mode, the coordinate data including the first coordinates of four corners of the input image and the second coordinates of four corners of the non-corrected output image, the selectively distributing including performing one of
  based on the first correction mode being selected, calculating a write control parameter based on the first coordinates and the second coordinates being in a state as the coordinate data is received and further disabling correction to the input image by a electrophotographic plotter based on distributing first coordinates and second coordinates that are identical to each other, the write control parameter being used for the correction of the input image by controlling write timing, and
  based on the second correction mode being selected, calculating the write control parameter based on the first coordinates and the second coordinates in the first direction being in the state as the coordinate data is received and the first coordinates and the second coordinates in the second direction being identical to each other and further disabling correction to the input image in the first direction by the electrophotographic plotter based on distributing first coordinates and second coordinates in the first direction that are identical to each other and first coordinates and second coordinates in the second direction that are in the state as the coordinate data is received.

15. A non-transitory recording medium storing a plurality of instructions which, when executed by one or more processors, cause the one or more processors to perform a method for processing an image, the method comprising:
acquiring an amount of displacement of an input image, the displacement occurring when the input image is formed on a medium to be output from an image forming apparatus as an output image, the amount of displacement determined based on first coordinates of four corners of the input image and second coordinates of four corners of a non-corrected output image;
selecting one correction mode of a first correction mode and a second correction mode according to the amount of displacement, when the input image is to be formed on the medium to be output from the image forming apparatus; and
selectively correcting the input image in both a first direction and a second direction based on the selected one correction mode, the selectively correcting including one of
  correcting the input image in both the first direction and the second direction based on applying a geometric correction, based on the selected one correction mode being the first correction mode, or
  correcting the input image in the first direction based on applying the geometric correction and further correcting the input image in the second direction based on controlling writing timing of the input image, based on the selected one correction mode being the second correction mode,
wherein the geometric correction includes
  performing inverse correction to generate a geometric correction parameter based on the amount of displacement of the input image, the first coordinates, and the second coordinates, and
  adjusting a shape of the input image based on the geometric correction parameter to generate a geometrically corrected image with four corners having corrected coordinates, such that the geometrically corrected image, when formed on the medium to be output as a corrected output image, has four corners having coordinates corresponding to the first coordinates.

16. The non-transitory recording medium of claim 15, wherein the method further comprises:
selecting the first correction mode based on a determination that the geometric correction is not any one or more of
a registration correction,
a magnification correction, and
a skew correction.

17. The non-transitory recording medium of claim 15, wherein the method further comprises:
selecting one correction mode of the first correction mode and the second correction mode according to a determination of whether a user instruction for drawing registration marks for cutting in addition to the amount of displacement is received.

18. The non-transitory recording medium of claim 15, wherein the method further comprises:
selecting one correction mode of the first correction mode and the second correction mode according to a user instruction indicating simplex printing or duplex printing in addition to the amount of displacement.

19. The non-transitory recording medium of claim 15, wherein the method further comprises:
selecting one correction mode of the first correction mode and the second correction mode according to a determination of whether a screen in the input image in addition to the amount of displacement is present.

20. The non-transitory recording medium of claim 15, wherein the method further comprises:
selectively distributing coordinate data based on the selected one correction mode, the coordinate data including the first coordinates of four corners of the input image and the second coordinates of four corners of the non-corrected output image, the selectively distributing including performing one of
based on the first correction mode being selected, calculating a write control parameter based on the first coordinates and the second coordinates being in a state as the coordinate data is received and further disabling correction to the input image by a electrophotographic plotter based on distributing first coordinates and second coordinates that are identical to each other, the write control parameter being used for the correction of the input image by controlling write timing, and
based on the second correction mode being selected, calculating the write control parameter based on the first coordinates and the second coordinates in the first direction being in the state as the coordinate data is received and the first coordinates and the second coordinates in the second direction being identical to each other and further disabling correction to the input image in the first direction by the electrophotographic plotter based on distributing first coordinates and second coordinates in the first direction that are identical to each other and first coordinates and second coordinates in the second direction that are in the state as the coordinate data is received.

21. An image processing device comprising:
a memory storing a program of instructions; and
a processor configured to execute the program of instructions to
acquire an amount of displacement of an input image, the displacement occurring when the input image is formed on a medium to be output from an image forming apparatus as an output image, the amount of displacement determined based on coordinate data, the coordinate data including first coordinates of four corners of the input image and second coordinates of four corners of a non-corrected output image, and
apply image processing to the input image according to the amount of displacement to perform geometric correction of the input image received in the input image; and
an electrophotographic plotter configured to control write timing of the input image according to the amount of displacement to perform correction of the input image;
wherein the processor is further configured to execute the program of instructions to select one correction mode of a first correction mode and a second correction mode according to the amount of displacement, when the input image is to be formed on the medium to be output from the image forming apparatus, to cause the input image to be selectively corrected in both a first direction and a second direction based on the selected one correction mode in accordance with selective distribution of the coordinate data, the selective distribution including performing one of
based on the first correction mode being selected, calculating a write control parameter based on the first coordinates and the second coordinates being in a state as the coordinate data is received and further disabling correction to the input image by the electrophotographic plotter based on distributing first coordinates and second coordinates that are identical to each other, the write control parameter being used for the correction of the input image by controlling write timing, and
based on the second correction mode being selected, calculating the write control parameter based on the first coordinates and the second coordinates in the first direction being in the state as the coordinate data is received and the first coordinates and the second coordinates in the second direction being identical to each other and further disabling correction to the input image in the first direction by the electrophotographic plotter based on distributing first coordinates and second coordinates in the first direction that are identical to each other and first coordinates and second coordinates in the second direction that are in the state as the coordinate data is received.

22. An image forming apparatus comprising:
the image processing device of claim 21.

* * * * *